Dec. 7, 1965 J. W. WHITSON 3,221,961
PERFORATING APPARATUS
Filed July 3, 1962 3 Sheets-Sheet 1

Dec. 7, 1965   J. W. WHITSON   3,221,961
PERFORATING APPARATUS
Filed July 3, 1962   3 Sheets-Sheet 2
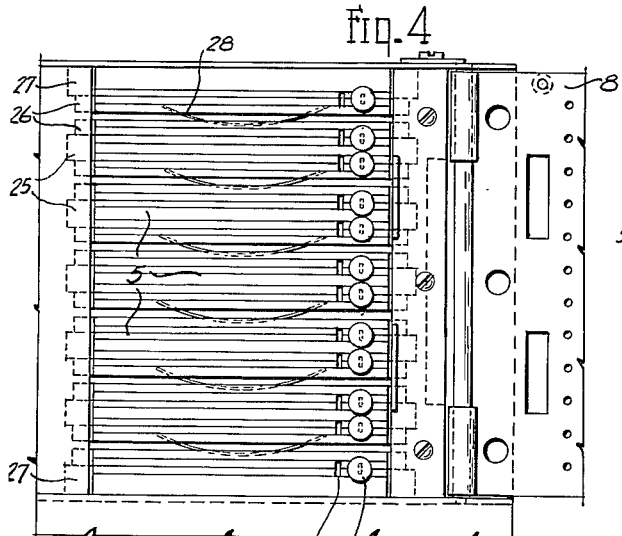
Fig. 4
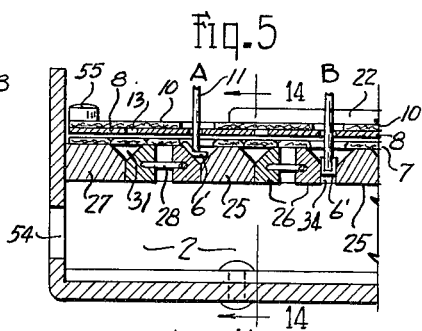
Fig. 5
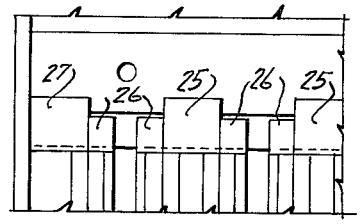
Fig. 12
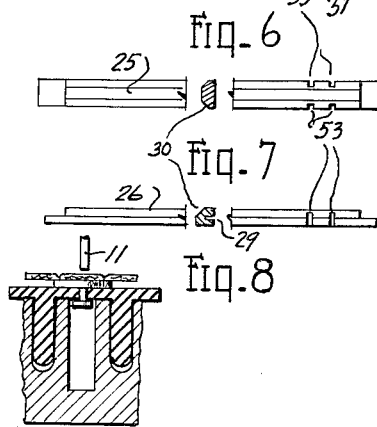
Fig. 6 · Fig. 7 · Fig. 8 · Fig. 11
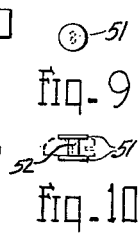
Fig. 9 · Fig. 10
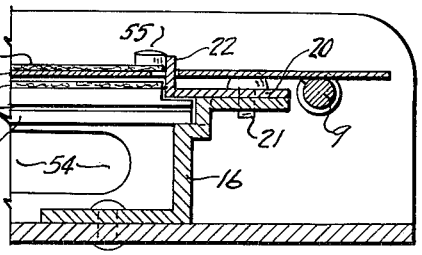
Fig. 13 · Fig. 14

Dec. 7, 1965  J. W. WHITSON  3,221,961
PERFORATING APPARATUS
Filed July 3, 1962  3 Sheets-Sheet 3
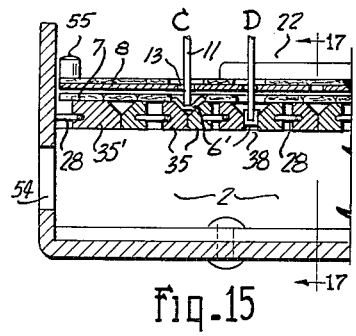
Fig. 15
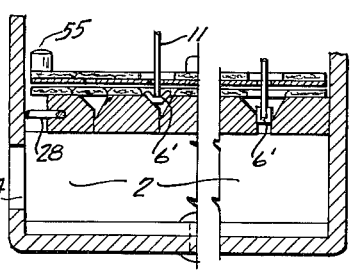
Fig. 18
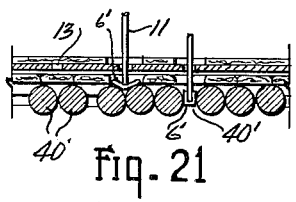
Fig. 21
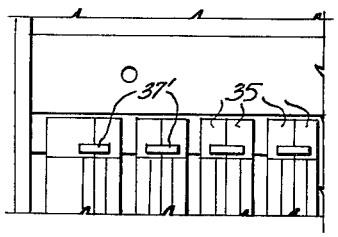
Fig. 16
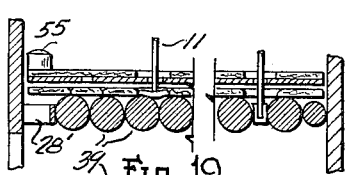
Fig. 19
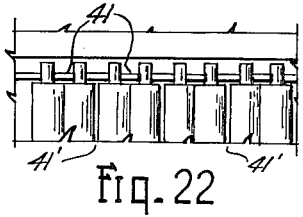
Fig. 22
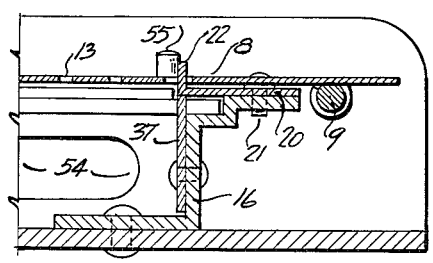
Fig. 17
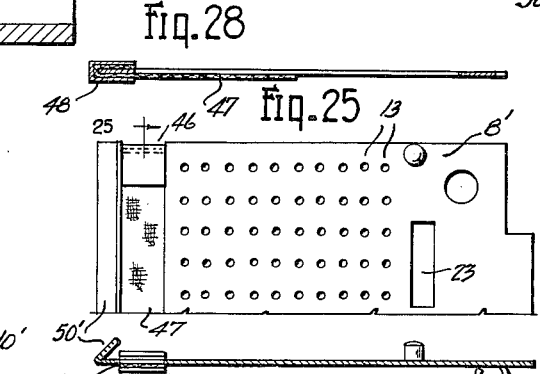
Fig. 20
Fig. 23
Fig. 28
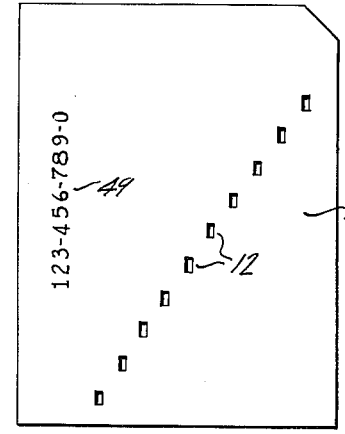
Fig. 26
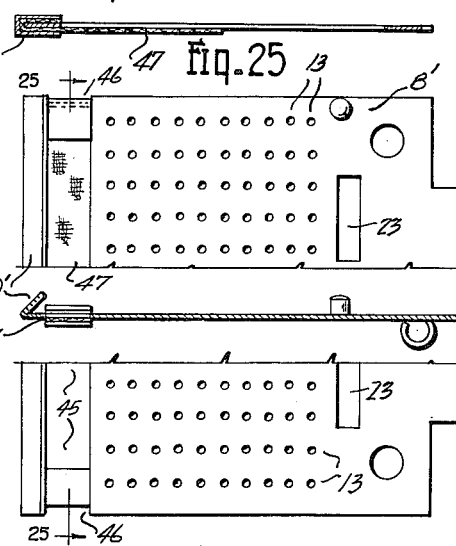
Fig. 25
Fig. 24
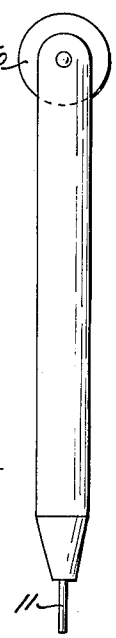
Fig. 27

United States Patent Office 3,221,961
Patented Dec. 7, 1965

3,221,961
PERFORATING APPARATUS
John W. Whitson, 120 Cabrini Blvd., New York 33, N.Y.
Filed July 3, 1962, Ser. No. 207,345
7 Claims. (Cl. 225—93)

My invention relates to a device for punching out portions of a sheet material which is adapted to insure the complete severance and removal of the punched-out portions from the sheet. The invention relates particularly to apparatus for facilitating the recording of information in a record card by punching out previously scored portions of the card to provide index slits defining areas of recordation having means to secure the positive and complete separation of the punched-out portions from the card, and which is especially well suited for use in portable, manually operated devices for this purpose.

Machines controlled by normally nonconductive record cards perforated in a predetermined pattern to provide slits capable of being electrically sensed by the machine have come into widespread use for tabulating data, statistical studies, accounting and similar applications. Perforated payroll checks, insurance premium notices, credit card invoices and the like have become a commonplace of everyday life. It is imperative for accurate operation of such machines that the record cards employed contain only sharply defined unobstructed index slits of critical dimensions. It is essential, therefore, that portions of the record card punched out to provide these index slits be completely severed and removed from the record card. Otherwise chips punched from the card but not completely severed therefrom may partially or totally close the intended slit and thus prevent sensing of the slit by the processing machine. Precision punching machines, which for the most part are too bulky to be conveniently portable, are capable of entering the required sharply defined, critically dimensioned slits in large numbers of record cards while assuring complete removal of punched-out chips from the perforated cards. These machines are, however, of little use when it is desired to record data on record cards in the field where it would be inconvenient or impossible to carry a precision punching machine. This problem has been met recently by the provision of compact, portable, perforating mechanisms employing a hand-held punch and pre-scored records cards.

Some devices of this type typically comprise a backing plate containing a plurality of holes corresponding to the index positions in a record card. The backing plate may be provided with means to receive and position a record card above the plate with its index positions aligned with the holes in the backing plate. The index positions of the record cards employed in such devices are defined by scorings which enclose substantially but not completely the individual index positions thus weakening the bond between these areas and the surrounding portions of the card. In operation the pre-scored record card is inserted into the perforating device above the perforated backing plate and held in position by guides or other means with its index positions aligned with the holes in the backing plate. A hand-held punch is pressed against any desired index position in the record card. Light but firm pressure on the punch serves to break the weakened index area away from the surrounding record card and force the punched-out chip through the corresponding hole in the backing plate. Another device of this character comprises a backing board of elastic material which is adapted to grip or encompass the punched-out chips as they are removed from the record card by the hand-held punch.

The primary object of my invention is to provide an apparatus for punching out portions of a sheet material having means for insuring the complete severance and removal of the punched-out portions from the work piece and their passage through a backing means.

Another object of my invention is to provide an apparatus with a backing means comprising rigid backing members which are adapted to maintain lateral pressure against the punched-out portion of the sheet material and the hand-held punch so that the punched-out portion will be held against the punch by such lateral pressure until it is completely severed from the sheet material and has passed through the backing means.

Another object of my invention is to provide an apparatus with an improved backing means adapted to positively strip punched-out chips from the punch after passing through the backing means.

Another object of my invention is to provide means in the apparatus which can be selectively positioned to obstruct the punch from punching out pre-selected index areas from the record card.

Another object of my invention is to provide an apparatus of the character described comprising a hand support so that hand written information can be readily placed on the record card.

Another object of my invention is to provide an apparatus with a pressure means for holding the record card in processing position and in precision registration with the backing means.

Another object of my invention is to provide an apparatus of the character described which may be simply and inexpensively constructed, operated and maintained.

These and other objects of my invention and the manner in which they are attained will be apparent from the following detailed description of the preferred embodiment illustrated in the accompanying drawings in which:

FIG. 1 is a plan view.
FIG. 2 is a sectional view taken on line 2—2 of FIG. 1.
FIG. 3 is a sectional view taken on line 3—3 of FIG. 1.
FIG. 4 is a plan view of a pre-scored tabulating card.
FIG. 5 is a plan view of a credit or identity card.
FIG. 6 is a partial plan view illustrating the backing means portion of FIG. 1.
FIG. 7 is a plan and sectional view of a backing board member.
FIG. 8 is an elevation and sectional view of a backing board member.
FIG. 9 is a plan view of a punch obstructor.
FIG. 10 is a side view of same.
FIG. 11 is an enlarged sectional view of a portion of the backing board of Abissi—2,949,292.
FIG. 12 is an enlarged sectional view of a portion of FIG. 3.
FIG. 13 is a plan view of same.
FIG. 14 is an enlarged sectional view taken on line 14—14 of FIG. 12.
FIG. 15 illustrates an alternate design for the backing board members of FIG. 12.
FIG. 16 is a plan view of same.
FIG. 17 is a sectional view taken on line 17—17 of FIG. 15.
FIG. 18 illustrates an alternate design for the backing board members of FIG. 12.
FIG. 19 illustrates an alternate design for the backing board members of FIG. 18.
FIG. 20 is a side view of a backing board member of FIG. 19.
FIG. 21 illustrates an alternate design for the backing board members of FIG. 19.
FIG. 22 is a plan view of same.
FIG. 23 is an enlarged sectional view of a single member backing board.
FIG. 24 is a broken plan view, including a longitudinal sectional view, of a credit card holder with an ink ribbon for imprinting invoice cards.

FIG. 25 is a sectional view taken on line 25—25 of FIG. 24.

FIG. 26 is a plan view of a credit card for use with the holder illustrated in FIG. 24.

FIG. 27 is a side view of a hand-held punch and pressure roller.

FIG. 28 is an enlarged plan view of a corner of a pre-scored tabulating card.

An important feature of my invention resides in the provision of backing means for use in removing punch-outs from an area of sheet material as it is punched by a perforating device in which members of the backing means are adapted to form grooves for the reception of a punch-out as it is first pressed from the sheet material and then function to open a slot for the punch-out to pass through the backing means while at the same time maintaining lateral pressure to hold the punch-out against the perforating device for it to be gripped and completely removed from the sheet material.

Figure 2:
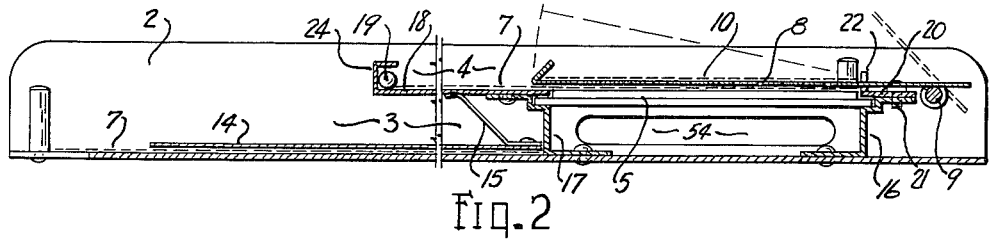
Figure 1:
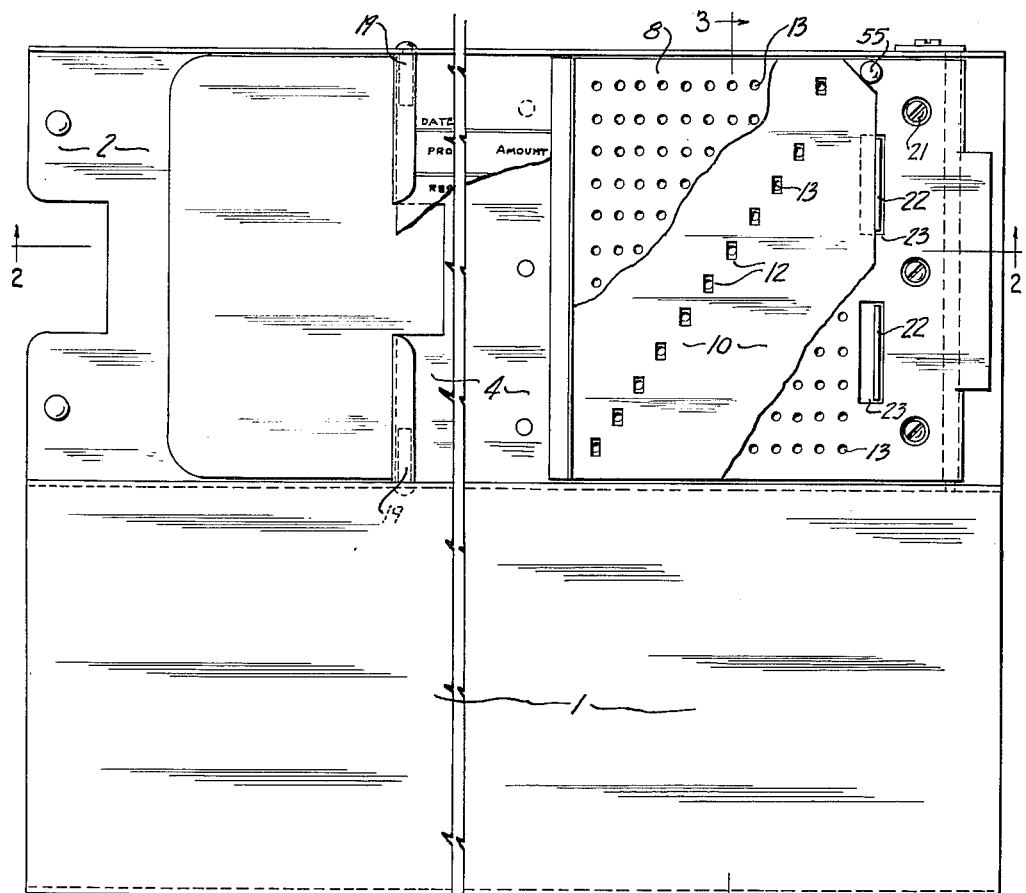

In the drawings: a sheet of suitable material is formed into two reversed channels, one of which provides a table or hand support 1 and the other channel 2 provides space for a card storage compartment 3, a card processing compartment 4 and a backing board, or means 5 for removing pre-scored areas 6 from a tabulating card 7 (illustrated in dotted lines in FIG. 2). A credit or identity card holder 8, journaled on shaft 9, is positioned over the pre-scored areas 6 of the tabulating card 7 and a credit card 10 (illustrated in dotted lines in FIG. 2) is positioned in the holder so that a hand-held punch 11 can be inserted through an opening 12 in the credit card and an opening 13 in the holder for the punch to press downwardly against an underlying pre-scored area of the tabulating card for the punch to co-act with the backing means and remove the pre-scored area from the tabulating card.

The card storage compartment 3 contains a pressure plate 14 which is biased against cards contained therein by spring member 15.

The backing means 5 is supported on angular end members 16 and 17 which are secured to the bottom of channel 2; member 17 supports the bottom plate 18 of the card processing compartment 4 so that the plate is biased upwardly against the pins 19 which are secured in the side walls of channel 2; the upward bias of plate 18 serves to grip the left hand edge of a tabulating card when it is placed in the processing compartment 4 and under the pins 19. Member 16 supports cover plate 20 which is secured to it by screws 21; the cover plate has two upwardly extending members 22 which pass through the openings 23 in holder 8; these members serve as the right hand limits of the card processing compartment 4 and the credit card holder 8.

Holder 8 is illustrated in its open position in FIG. 6 and when in this position a tabulating card 7 can be inserted into the card processing compartment 4 by pressing downwardly on the channel shaped portion 24 of plate 18 (FIG. 2) and inserting the card 7 under the pins 19 so that it will be held firmly in compartment 4 and its pre-scored areas 6 will be in substantially precision alignment with the openings 13 of the credit card holder 8 and with the members of the backing means.

Figure 3:
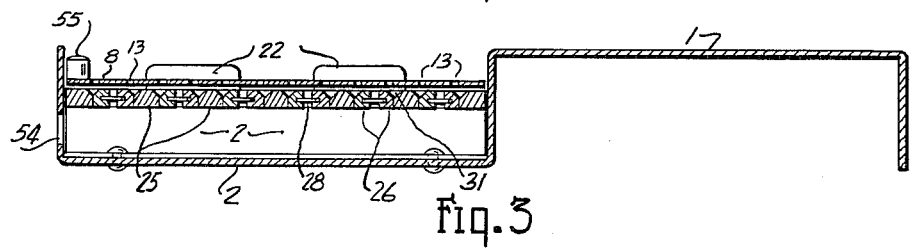

The backing means 5 comprises a plurality of stationary backing members 25 and 27 which are held in recesses in members 16 and 17 (see FIG. 13 which has cover plate 20 removed) and a plurality of associated movable backing members 26 which are biased laterally against the stationary members 25 and 27 by the springs 28 which fit into the grooves 29 formed in the members 26; the ends of the members 25, 26 and 27 are shaped (as illustrated in FIGS. 7 and 8) to fit into the grooves formed by the members 16 and 17, the cover plate 20 and the bottom plate 18. All of the backing members have one or both upper edges beveled as at 30, so that when they are assembled as illustrated in FIGS. 3 and 12 their beveled edges will form the V shaped grooves 31 which underlie each horizontal row of pre-scored areas 6 of the tabulating card 7. The meeting point of the beveled edges, which are the bottoms of the grooves 31, are offset from the centers of their corresponding openings 13 in the credit card holder 8; the distance of the offset being substantially equal to the thickness of the tabulating card 7 plus the radius of the punch 11.

FIG. 28 illustrates the longer edges 32 of the pre-scored areas 6 as not quite meeting with the shorter edges 33; the unscored material at the corners of the areas 6 serves to hold them in the card. When punch 11 is pressed against a pre-scored area, as illustrated at A in FIG. 12, the area will bend downwardly and start breaking away from card 7 to become chip, or punch-out, 6'. Continued downward movement of the punch will press the chip against member 26 moving it laterally against the bias of its spring 28 and thus the chip will be gripped between the punch and member 26; further downward movement of the punch will complete the breakaway of the chip and, as illustrated at position B, member 26 will continue in its lateral movement causing a slot 34 to open through which the chip and the punch can pass; the withdrawal of the punch will cause the chip to be stripped therefrom and the slot 34 to close.

FIGS. 15 to 22 inclusive illustrate other types of backing members which operate on the lateral pressure principle described in connection with FIGS. 3 and 12.

In FIGS. 15, 16 and 17 the members 35 are similar to the members 26 of FIG. 12 but the bottom of the grooves formed by their beveled edges are centered substantially under the centers of the openings 13 in the credit card holder 8. Each pair of members 35 has an opening formed therein for the reception of an upwardly extending member 37' formed on plate 37 which is fastened to end member 16; member 37' serves as a stop for centering the grooves formed by the members 35 substantially under the centers of the openings 13. The members 35 are biased together in pairs by the springs 28. End members 35' are similar to members 35 except that they are wider. When the punch is pressed downwardly as at C both sides of the chip 6' will be gripped between the members 35 and continued downward movement of the punch as at D will move the members 35 laterally and move the chip through the opening 38.

FIG. 18 illustrates how all of the backing members can be laterally biased by a single spring 28.

FIGS. 19 and 20 illustrate backing members 39 as circular in cross-section and biased laterally by a flat spring 28'. It is to be noted that the movement of the punch and chip through the circular members will cause them to rotate and thus assist in the chip removal. The diameter of the member 39 is substantially the length of a pre-scored area 6.

FIGS. 21 and 22 also illustrate the backing members as circular in cross-section but of a lesser diameter than those of FIGS. 19 and 20. The members are centered in pairs under the openings 13 in the credit card holder 8, as described in connection with FIG. 15. The radius of a member 40 is less than a member 39 of FIG. 19 the difference being slightly less than the radius of the punch 11 plus the thickness of the tabulating card 7, thus the chip 6' will be under lateral compressive pressure when passing through a pair of members 40. In FIG. 22 the members 41 serve the same purpose as the members 37' of FIG. 17, they keep the members 40 positioned in pairs under the openings 13 of the credit card holder 8. The width of the opening 41' in FIG. 22 is substantially one-half of the opening 40' of FIG. 21.

In FIG. 21 the punch 11 is shown at 40' forcing a chip 6' between a pair of members 40 which move laterally to receive the chip between them; the members 41 of FIG. 22 confine the lateral movement of members 40 so that the chip is slightly compressed to be gripped substantially evenly by each member 40 and thus insure that the chip will be completely removed from the card.

FIG. 23 illustrates a backing means 42 comprising a single element, laterally biased by a single spring 28, and having a series of aligned grooves 43 formed therein; the grooves being positioned under each horizontal row of pre-scored areas 6 in the tabulating card 7 so that downward movement of the punch will press a chip 6' against the inclined wall of a groove and thus grip the chip between the punch and the wall for further downward movement of the punch to complete the removal of the chip from the card. The chips can remain in the grooves until the tabulating and credit cards have been removed from the apparatus at which time the apparatus can be inverted so that the chips will fall out of the backing means. The chips can also be passed through an opening 44 formed in the bottom of the groove, when the backing means is so prepared, there being an opening 44 for each pre-scored area 6.

FIGS. 24 and 25 illustrate a credit card holder 8' which is similar to credit card holder 8 and can be substituted for it when it is desired to use imprinting credit cards in the apparatus. Holder 8' differs from holder 8 in that it has openings 45 and 46 formed therein for the reception of a plastic backed ink ribbon 47 which is folded over the edges of the holder in the openings 46 and cemented to the upper surface of the holder or held with a metal clip as at 48. A plastic credit card 10' is illustrated in FIG. 26 with its account number 49 formed in depressed printing characters and positioned to register with the ink ribbon 47 when the credit card is placed in holder 8', in which position a pressure roller 50, mounted on the punch handle, can be drawn across the printing characters under applied pressure and the account number will imprint upon an underlying tabulating card 7. The edge 50' of the holder 8' serves as a means for aligning the roller 50 with the ink ribbon.

FIGS. 9 and 10 illustrate a selectively movable obstructing means which, when placed between a pair of backing members and under an opening 13 in the credit card holder, will prevent the removal of its related prescored area 6 by the punch 11. The obstructing means 51 comprises two disks 51' joined by a link member 52 which fits into the openings 53 in the backing members so that when assembled in the apparatus, the backing members will be as illustrated in dotted lines in FIG. 10. With a plurality of openings 53 cut in each of the backing members the obstructing means can be selectively moved to block the punch 11 from removing any prescored area 6 from the tabulating card 7.

FIG. 11 is substantially a copy of FIG. 4 of Abissi Patent No. 2,949,292 and it illustrates how the obstructing means can be utilized with the resilient backing members 19 of Abissi.

The chips 6' which have passed through the backing means can be removed from the apparatus by shaking them through opening 54 in the rear wall of channel 2.

*Operation*

In FIG. 4 tabulating card 7 is illustrated as an invoice card printed with a form for an oil company credit card system. In operation the attendant takes a blank card 7 from the card storage compartment 3, opens the credit card holder 8 to the position illustrated in FIG. 6, and inserts card 7 in processing compartment 4 with its left hand edge against member 24 and gripped between plate 18 and the pins 19. The attendant then fills in the sales data in the form at the left of card 7 and passes the apparatus to the customer for his signature. The attendant then closes holder 8 over the card 7, takes the customer's credit card and places it in the holder 8 with the clipped corner of the credit card in register with pin 55, and with punch 11 punches the credit card number code into card 7. He then returns the credit card to the customer and removes the invoice card 7 from the apparatus. This card and others similarly processed are then used by the oil company for processing customer accounts receivable. It is customary to furnish the customer with a copy of the sales data and this can be done in the form of a stub and carbon snap-out underlying the printed sales form at the left of card 7.

The opening 56 in the credit card 10 provides a means for mechanically checking the expiration date of the card. Columns 78 and 80, of the tabulating card 7, each have twelve pre-scored areas numbered 1 to 12 representing the months of the year. With column 78 representing the year 1961 the opening 56 signifies that the card was issued in January and with all of the obstructing means 51 aligned under the pre-scored areas of column 80 (as illustrated in FIG. 6) then when punch 11 is inserted through opening 56 and its underlying opening 13 in the credit card holder 8, pre-scored area 1 of column 78 will be punched from the tabulating card 7. When a new credit card is issued for January 1962 this card will be punched with an opening 56 in position 1 column 80 and the obstructing means will be moved and aligned under the pre-scored area 1 of column 78 of the tabulating card 7 to block this area from being punched should the customer present his expired credit card. The same procedure will be followed for all of the months of the year 1961 as new credit cards are issued. Cards of 1963 issue would be punched in column 78, 1964 in column 80, etc., and the obstructing means 51 will be moved accordingly. Thus an automatic check means is provided against the use of expired credit cards. The credit cards are described as being issued monthly on a yearly basis, should the basis of issue be two years then column 76 would be included accordingly.

While the apparatus has been described in the manner of preparing tabulating cards for use in an oil company credit card accounting system it is not to be constructed that the disclosed apparatus is limited to this single use; broadly it can be used in the preparation of tabulating cards for all of the various purposes in which they are employed. Nor is it to be considered as limited for use only with tabulating cards as it can be used to remove selected pre-scored areas from any character and size of material; broadly the cards 7 can be deemed sheet-like members and they are so specified in the appended claims; likewise the credit cards 10 are so designated. With other systems the credit card 10 could be an identity or pass card, a parts card, etc.

The obstructing means 51 are illustrated as functioning with columns 78 and 80 of the tabulating card 7 but they must not be considered as limited to this illustration as the openings 53 can be formed along the edges of the backing members as desired for positioning the obstructing means according to any planned system of use.

The advantages of the novel punching apparatus shown in the drawings are readily apparent. In addition to its obvious portability, simplicity of manufacture and operation it provides means for the positive severance and complete removal of punched-out chips from a pre-scored record card thus eliminating the possibility of such chips remaining attached to the record card by a few fibers of paper or other material and thus causing inaccurate operation of a card processing machine. This result is attained to a large extent by the gripping action provided by the lateral movement of the novel backing members in the new apparatus.

Although the invention has been described above in connection with a portable, manually operated perforating device of unique construction for which it is especially suitable, the inventive concept is applicable to other types of apparatus. For example, mechanically operated punching mechanisms can also be provided with means of insuring the complete severance and removal of punched-out portions from a work piece according to the present invention. The invention may even be employed in the form of a backing board or surface composed of laterally movable elements applied to a curved platen adapted for use in perforating a sheet material by means of a rolling punching device.

The terms and expressions which have been employed are used as terms of description and not as limitation, and there is no intention, in the use of such terms and expressions of excluding any equivalents of the features shown and described or portions thereof, but it is recognized that various modifications are possible within the scope of the invention claimed.

What is claimed is:

1. Backing means for use in removing punch-outs from an area of a sheet-like member as the latter is punched, comprising: a plurality of pairs of stationary and movable means normally disposed in close relationship to form a surface with a depression formed at the meeting of pairs of said means and underlying the area of a punch-out; means for laterally biasing a movable means against a stationary means; means for aligning and receiving a sheet-like member with the area thereof to be punched and the portion of the sheet-like member immediately adjacent thereto aligned with and juxtaposed to said surface; and holding means for supporting said plurality of stationary and movable means for a movable means to move laterally under pressure and open a slot for receiving a punch-out from said sheet-like member and to close said slot when said pressure is removed.

2. Backing means for use in removing punch-outs from an area of a sheet-like member as the latter is punched, comprising: a plurality of pairs of movable means normally disposed in close relationship to form a surface with a depression formed at the meeting of pairs of said means and underlying the area of a punch-out; means for laterally biasing said pairs of movable means against each other; means for aligning and receiving a sheet-like member with the area thereof to be punched and the portion of the sheet-like member immediately adjacent thereto aligned with and juxtaposed to said surface; and holding means for supporting said pairs of movable means to move laterally under pressure and open a slot for receiving a punch-out from said sheet-like member and to close said slot when said pressure is removed.

3. Backing means for use in removing punch-outs from an area of a sheet-like member as the latter is punched, comprising: a plurality of movable means circular in cross-section and normally disposed in close relationship to form a support with the contact point of pairs of said means underlying the area of a punch-out; means for laterally biasing said movable means against each other; means for aligning and receiving a sheet-like member with an area thereof to be punched and the portion of the sheet-like member immediately adjacent thereto aligned with and juxtaposed to said support; and holding means for supporting said plurality of movable means to move laterally under pressure and open a slot for receiving a punch-out from said sheet-like member and to close said slot when said pressure is removed.

4. Backing means for use in removing punch-outs from an area of a sheet-like member as the latter is punched, comprising: a plurality of pairs of movable means normally disposed in close relationship to form a surface with a depression formed at the meeting of each pair of said means and underlying the area of a punch-out; means for biasing each of said pairs of movable means together; means for aligning and receiving a sheet-like member with the area thereof to be punched and the portion of the sheet-like member immediately adjacent thereto aligned with and juxtaposed to said surface; and holding means for supporting said pairs of movable means to move laterally under pressure and open a slot for receiving a punch-out from said sheet-like member and to close said slot when said pressure is removed.

5. Backing means for use in removing punch-outs from an area of a sheet-like member as the latter is punched, comprising: a plurality of pairs of movable means circular in cross-section and disposed in close relationship to form a support with the contact point of each pair of movable means underlying the area of a punch-out; means for aligning and receiving a sheet-like member with an area thereof to be punched and the portion of the sheet-like member immediately adjacent thereto aligned with and juxtaposed to said support; and holding means for supporting said pairs of movable means to move laterally under pressure and open a slot for receiving a punch-out from said sheet-like member.

6. Backing means for use in removing punch-outs from an area of a sheet-like member as the latter is punched, comprising: an element with a surface having a depression therein underlying the area of a punch-out; means for laterally biasing said element; means for aligning and receiving a sheet-like member with an area thereof to be punched and the portion of the sheet-like member immediately adjacent thereto aligned with and juxtaposed to said surface; and holding means for supporting said element for it to move laterally under pressure from a normal position when receiving a punch-out from said sheet-like member in said depression and to return to normal position when said pressure is removed.

7. In an apparatus for entering index openings in a record card by punching out pre-scored areas from said card comprising, in combination: a base member holding a plurality of elongated backing members with the edge portions thereof in closely opposed relationship for supporting a pre-scored record card; means for aligning and receiving said record card with its pre-scored areas aligned with and juxtaposed to said edge portions; and selectively movable means positioned between said edge portions for preventing the punching of a pre-scored area from said record card.

References Cited by the Examiner
UNITED STATES PATENTS

| | | | |
|---|---|---|---|
| 2,314,690 | 3/1943 | Dawson | 269—15 |
| 2,606,494 | 8/1952 | Vogt | 101—269 |
| 2,935,939 | 5/1960 | Doherty et al. | 101—269 |
| 2,949,292 | 8/1960 | Abissi | 269—15 |
| 3,015,424 | 1/1962 | Laframboise | 225—93 |

ROBERT C. RIORDON, *Primary Examiner.*

W. B. PENN, FRANK SUSKO, *Examiners.*